US012619388B2

(12) United States Patent
Choi et al.

(10) Patent No.: US 12,619,388 B2
(45) Date of Patent: May 5, 2026

(54) DISPLAY APPARATUS FOR IDENTIFYING CONNECTION AND DISCONNECTION OF EXTERNAL DISPLAY DEVICE AND CONTROL METHOD THEREOF

(71) Applicant: SAMSUNG ELECTRONICS CO., LTD., Suwon-si (KR)

(72) Inventors: Nakwon Choi, Suwon-si (KR); Sunyoung Kim, Suwon-si (KR); Youngwook Kim, Suwon-si (KR); Sooyeoun Yoon, Suwon-si (KR); Dongho Lee, Suwon-si (KR); Yongjoo Lee, Suwon-si (KR); Bumho Chun, Suwon-si (KR); Jaewon Jung, Suwon-si (KR); Suan Choi, Suwon-si (KR); Saerom Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/925,711

(22) Filed: Oct. 24, 2024

(65) Prior Publication Data

US 2025/0094113 A1 Mar. 20, 2025

Related U.S. Application Data

(63) Continuation of application No. PCT/KR2024/012642, filed on Aug. 23, 2024.

(30) Foreign Application Priority Data

Sep. 20, 2023 (KR) ........................ 10-2023-0125890

(51) Int. Cl.
*G06F 3/14* (2006.01)
(52) U.S. Cl.
CPC .................................. *G06F 3/1446* (2013.01)

(58) Field of Classification Search
CPC ..... G06F 3/1446; G06F 3/1423; G06F 1/1647
See application file for complete search history.

(56) References Cited

U.S. PATENT DOCUMENTS 7,821,495 B2 10/2010 Park
10,031,712 B2 7/2018 Stahl et al.
(Continued)

FOREIGN PATENT DOCUMENTS

JP 6562621 B2 8/2019
JP 2021-135336 A 9/2021
(Continued)

OTHER PUBLICATIONS

International Search Report and Written Opinion dated Dec. 13, 2024, issued by the International Searching Authority in International Application No. PCT/KR2024/012642.

*Primary Examiner* — Matthew A Eason
*Assistant Examiner* — Scott D Au
(74) *Attorney, Agent, or Firm* — Sughrue Mion, PLLC

(57) ABSTRACT

A display apparatus includes a memory storing first apparatus information corresponding to the display apparatus and instructions, a sensor, a display, a communication interface, and at least one processor operatively connected to the memory and configured to execute the instructions to, based on detecting connection with an external display apparatus through the sensor, receive second apparatus information corresponding to the external display apparatus from the external display apparatus, generate integrated apparatus information based on the first apparatus information and the second apparatus information, and control the communication interface to transmit the integrated apparatus information to a source apparatus.

18 Claims, 12 Drawing Sheets

(56)     References Cited

U.S. PATENT DOCUMENTS

| | | | |
|---|---|---|---|
| 10,817,242 B2 | 10/2020 | Momose et al. | |
| 2013/0293443 A1* | 11/2013 | Seo | G06F 3/1446 |
| | | | 345/1.2 |
| 2014/0240201 A1* | 8/2014 | Takahashi | G09G 5/10 |
| | | | 345/1.3 |
| 2015/0293739 A1 | 10/2015 | Choi et al. | |
| 2015/0347077 A1* | 12/2015 | Kataoka | G06F 3/147 |
| | | | 345/1.1 |
| 2016/0335039 A1 | 11/2016 | Cho et al. | |
| 2020/0225903 A1* | 7/2020 | Cohen | G09G 5/12 |

FOREIGN PATENT DOCUMENTS

| | | |
|---|---|---|
| KR | 10-0759139 B1 | 9/2007 |
| KR | 10-0792240 B1 | 1/2008 |
| KR | 10-0833372 B1 | 5/2008 |
| KR | 10-1397397 B1 | 5/2014 |
| KR | 10-2015-0117018 A | 10/2015 |
| KR | 10-2016-0133867 A | 11/2016 |
| KR | 10-2020-0121636 A | 10/2020 |
| KR | 10-2021-0032857 A | 3/2021 |

* cited by examiner

DISPLAY APPARATUS FOR IDENTIFYING CONNECTION AND DISCONNECTION OF EXTERNAL DISPLAY DEVICE AND CONTROL METHOD THEREOF

CROSS-REFERENCE TO RELATED APPLICATION(S)

This application is a bypass continuation of International Application No. PCT/KR2024/012642, filed on Aug. 23, 2024, which is based on and claims priority to Korean Patent Application No. 10-2023-0125890, filed on Sep. 20, 2023, in the Korean Intellectual Property Office, the disclosures of which are incorporated by reference herein in their entireties.

BACKGROUND

1. Field

The disclosure relates to a display apparatus and a control method thereof, and more particularly, to a display apparatus that detects connection or disconnection of an external display apparatus, and a control method thereof.

2. Description of Related Art

Spurred by the development of electronic technologies, various types of electronic apparatuses are being developed and distributed. In particular, display apparatuses such as mobile apparatuses and a TVs have developed rapidly in recent years.

There is a trend toward more immersive displays and multi-displays in home environments.

Each of a plurality of display apparatuses should be connected to a source apparatus, and if a new display apparatus is additionally connected, or any one display apparatus is disconnected, there is a need to newly recognize the resolutions, the screen sizes, etc., and there is a problem that this increases the user's inconvenience.

For example, after the user directly connected a new display apparatus to a source apparatus, there is a need to reset the resolutions of the entire screens. Also, after any one display apparatus was separated, there is a need to reset the resolutions of the other screens.

SUMMARY

According to an aspect of the disclosure, a display apparatus includes a memory storing first apparatus information corresponding to the display apparatus and instructions, a sensor, a display, a communication interface, and at least one processor operatively connected to the memory, the sensor, the display, and the communication interface, the at least one processor being configured to execute the instructions to, based on detecting connection with an external display apparatus through the sensor, receive second apparatus information corresponding to the external display apparatus from the external display apparatus, generate integrated apparatus information based on the first apparatus information and the second apparatus information, and control the communication interface to transmit the integrated apparatus information to a source apparatus, wherein the integrated apparatus information includes information on resolutions that can be displayed through the display apparatus and the external display apparatus.

According to an aspect of the disclosure, a control method of a display apparatus including first apparatus information corresponding to the display apparatus, includes, based on detecting connection with an external display apparatus, receiving second apparatus information corresponding to the external display apparatus from the external display apparatus, generating integrated apparatus information based on the first apparatus information and the second apparatus information, and transmitting the integrated apparatus information to a source apparatus, wherein the integrated apparatus information includes information on resolutions that can be displayed through the display apparatus and the external display apparatus.

According to an aspect of the disclosure, a computer-readable recording medium including a program executing a control method of a display apparatus including first apparatus information corresponding to the display apparatus, includes, based on detecting connection with an external display apparatus, receiving second apparatus information corresponding to the external display apparatus from the external display apparatus, generating integrated apparatus information based on the first apparatus information and the second apparatus information, and transmitting the integrated apparatus information to a source apparatus, wherein the integrated apparatus information includes information on resolutions that can be displayed through the display apparatus and the external display apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
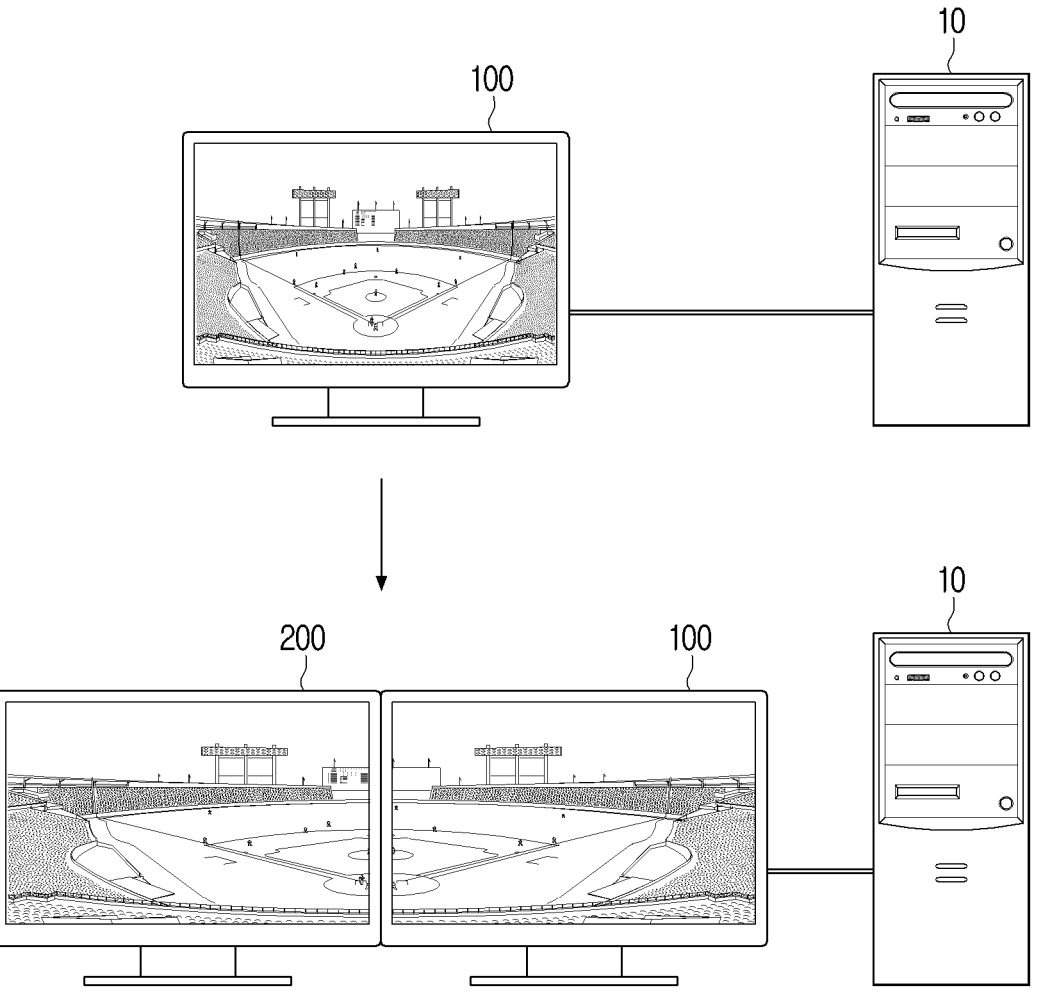
FIG. 1 is a diagram for illustrating a display apparatus detecting connection with an external display apparatus according to one or more embodiments of the disclosure.

Hereinafter, example embodiments of the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field or previous court decisions, or emergence of new technologies, etc. Further, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A or B" should be interpreted to mean any one of "A" or" B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In addition, singular expressions include plural expressions, unless defined differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, "a module" or "a part" performs at least one function or operation, and may be implemented as hardware or software, or as a combination of hardware and software. Also, a plurality of "modules" or "parts" may be integrated into at least one module and implemented as at least one processor, except "modules" or "parts" which need to be implemented as specific hardware.

In addition, in this specification, the term "user" may refer to a person who uses an electronic apparatus or an apparatus using an electronic apparatus (e.g.: an artificial intelligence electronic apparatus).

Hereinafter, example embodiments of the disclosure will be described in more detail with reference to the accompanying drawings.

FIG. 1 is a diagram for illustrating a display apparatus detecting connection of an external display apparatus according to one or more embodiments of the disclosure.

As illustrated in FIG. 1, a display apparatus 100 may be implemented as a TV, but is not limited thereto, and any apparatus equipped with a display function such as a video wall, a large format display (LFD), digital signage, a digital information display (DID), a projector display, etc. can be applied without limitation.

Also, the display apparatus 100 may be implemented as displays in various forms such as a liquid crystal display (LCD), organic light-emitting diodes (OLED), Liquid Crystal on Silicon (LCoS), Digital Light Processing (DLP), a quantum dot (QD) display panel, quantum dot light-emitting diodes (QLED), micro light-emitting diodes ($\mu$LED), mini LED, etc. The display apparatus 100 may also be implemented as a touch screen combined with a touch sensor, a flexible display, a rollable display, a 3D display, a display wherein a plurality of display modules are physically connected, etc.

With only a screen size that can be output by one display apparatus, the sense of immersion rather deteriorates, and it is felt that the size is insufficient for displaying various contents simultaneously. Thus there is a trend that more users are increasing a screen size that can be output by connecting a plurality of display apparatuses.

As one or more examples, if the display apparatus 100 and an external display apparatus 200 are arranged on the left side and the right side, a screen size that can be provided through the display apparatus 100 and the external display apparatus 200 increases, and the sense of immersion of the user may increase.

Also, a maximum resolution that can be provided through the display apparatus 100 and the external display apparatus 200 may increase as much as addition of the resolution of the display apparatus 100 and the resolution of the external display apparatus 200. For example, if the display apparatus 100 has a 2560×1440 resolution (QHD) in a 16:9 ratio, and the external display apparatus 200 has a 2560×1440 resolution in a 16:9 ratio, and the display apparatus 100 and the external display apparatus 200 are arranged on the left side and the right side, the maximum resolution that can be provided through the display apparatus 100 and the external display apparatus 200 may be a 5120×1440 resolution (DQHD) in a 32:9 ratio. However, the detailed numbers are merely examples for the convenience of explanation, and the disclosure is not limited thereto.

According to the related art, each of the display apparatus 100 and the external display apparatus 200 was connected to a source apparatus 10, and the source apparatus 10 received each of the resolution information of the display apparatus 100 and the resolution information of the external display apparatus 200, and then transmitted an image signal corresponding to information on resolutions that could be provided through the display apparatus 100 and the external display apparatus 200 to each of the display apparatus 100 and the external display apparatus 200.

For example, the source apparatus 10 received first resolution information of the display apparatus 100 (e.g., a 2560×1440 resolution) from the display apparatus 100, and received second resolution information of the external display apparatus 200 (e.g., a 2560×1440 resolution) from the external display apparatus 200, and then transmitted an image signal corresponding to third resolution information (e.g., a 5120×1440 resolution) based on the first resolution information and the second resolution information to the display apparatus 100 and the external display apparatus 200.

However, according to the related art, there was inconvenience that each of the display apparatus 100 and the external display apparatus 200 had to be connected to the source apparatus 10, and a screen size and the maximum resolution, etc. that could be output through the display apparatus 100 and the external display apparatus 200 could be identified only when the source apparatus 10 received each of the extended display identification data (EDID) of the display apparatus 100 and the EDID of the external display apparatus 200.

According to one or more embodiments of the disclosure, even if each of the display apparatus 100 and the external display apparatus 200 is not connected to the source apparatus 10, the display apparatus 100 may generate apparatus information including a screen size that can be output and the maximum resolution, etc. according to connection of the display apparatus 100 and the external display apparatus 200, and transmit the apparatus information to the source apparatus 10.

Also, according to one or more embodiments of the disclosure, the display apparatus 100 may update (or, reobtain) the apparatus information including the screen size that can be output and the maximum resolution, etc. according to disconnection of the external display apparatus 200, and transmit the updated apparatus information to the source apparatus 10.

FIG. 1 was illustrated by assuming the source apparatus 10 as a PC for the convenience of explanation, but this is merely one or more examples, and the disclosure is not limited thereto. The source apparatus 10 may also be implemented as electronic apparatuses in various types. For example, the source apparatus 10 may be implemented as electronic apparatuses in various types that provide image signals such as a streaming content output apparatus, a set-top box, a cloud server, an over-the-top (OTT) media service server, a PC, a video game console, a Blue Ray player, a digital versatile disc (DVD) player, etc.

Figure 2:
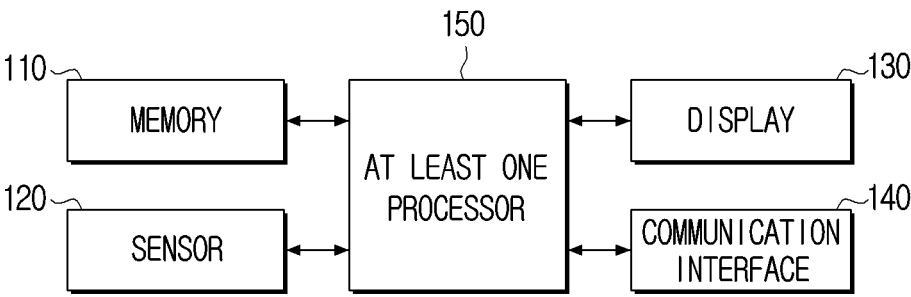
FIG. 2 is a block diagram illustrating a configuration of a display apparatus according to one or more embodiments of the disclosure.

FIG. 2 is a block diagram illustrating a configuration of a display apparatus according to one or more embodiments of the disclosure.

According to FIG. 2, the display apparatus 100 includes a memory 110, a sensor 120, a display 130, a communication interface 140, and at least one processor 150.

The memory 110 according to one or more embodiments of the disclosure may be implemented as an internal memory such as a ROM (e.g., an electrically erasable programmable read-only memory (EEPROM)), a RAM, etc., included in the at least one processor 150, or implemented as a separate memory from the at least one processor 150. In this case, the memory 110 may be implemented in the form of a memory embedded in the display apparatus 100, or implemented in the form of a memory that can be attached to or detached from the display apparatus 100 according to the use of stored data. For example, in the case of data for driving the display apparatus 100, the data may be stored in a memory embedded in the display apparatus 100, and in the case of data for an extended function of the display apparatus 100, the data may be stored in a memory that can be attached to or detached from the display apparatus 100.

In the case of a memory embedded in the display apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the display apparatus 100, the memory may be implemented as forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

In particular, in the memory 110 according to one or more embodiments, first apparatus information corresponding to the display apparatus 100 may be stored. Here, the first apparatus information corresponding to the display apparatus 100 may include EDID information.

The EDID information according to one or more embodiments may include information on the manufacturer ID, the apparatus ID, the EDID version, the types of the phosphor or the filter, the timing, the screen size (the horizontal size and the vertical size), the resolution, the supported function, the color characteristic (the color space), the luminance, etc. of the display apparatus 100.

The sensor 120 according to one or more embodiments may detect whether the external display apparatus 200 is connected to the display apparatus 100 or the connected external display apparatus 200 was disconnected.

For example, the sensor 120 may be implemented in various forms such as a magnetic sensor, an IR proximity sensor, a touch sensor, a switch, etc.

As one or more examples, the magnetic sensor may detect whether the external display apparatus 200 is connected based on a change of the magnetic field. For example, if the external display apparatus 200 is connected to the display apparatus 100 (or, if a part of the external display apparatus 200 is contacted), the sensor 120 may detect a change of the magnetic field.

As one or more examples, the IR proximity sensor may detect whether the external display apparatus 200 is connected based on the time that an infrared ray is reflected on the external display apparatus 200 and returns after the infrared ray was transmitted.

As one or more examples, the touch sensor may detect whether the external display apparatus 200 is connected by detecting a physical touch or content according to connection of the external display apparatus 200.

However, the implementation examples of the sensor 120 described above are merely examples for the convenience of explanation, and the disclosure is not limited thereto. For example, the sensor 120 may be implemented as connection ports in various types, and if the external display apparatus 200 is connected via wire or connected wirelessly through the connection port, the sensor 120 may receive a signal (e.g., a hot plug detect (HPD) signal) from the external display apparatus 200. According to one or more embodiments, the sensor 120 may detect whether the external display apparatus 200 is connected based on a signal received from the external display apparatus 200. As another example, the sensor 120 may be implemented as a switch inside a holder which the external display apparatus 200 can be attached to or detached from, and can detect whether the external display apparatus 200 is connected based on an on/off status of the switch.

The display 130 according to one or more embodiments may be implemented as a display including self-luminous elements, or a display including non-self-luminous elements and a backlight. For example, the display 130 may be implemented as displays in various forms such as a liquid crystal display (LCD), an organic light-emitting diodes (OLED) display, light-emitting diodes (LED), a micro LED, a mini LED, a plasma display panel (PDP), a quantum dot (QD) display, quantum dot light-emitting diodes (QLED), etc. Inside the display 130, driving circuits that may be implemented in forms such as an A-Si (amorphous silicon) TFT, a low temperature poly silicon (LTPS) TFT, an organic TFT (OTFT), etc., and a backlight unit, etc. may also be included. The display 130 may be implemented as a touch screen combined with a touch sensor, a flexible display, a rollable display, a 3D display, a display wherein a plurality of display modules are physically connected, etc.

The communication interface 140 including a circuit according to one or more embodiments receives inputs of various types of data. For example, the communication interface 140 may receive inputs of various types of data (e.g., image signals) from at least one source apparatus 10, an external storage medium (e.g., a USB memory), an external server (e.g., a webhard), etc. through communication methods such as ΔP-based Wi-Fi (Wi-Fi, a wireless LAN network), Bluetooth, Zigbee, a wired/wireless local area network (LAN), a wide area network (WAN), an Ethernet, the IEEE 1394, a high-definition multimedia interface (HDMI), a universal serial bus (USB), Thunderbolt™, a mobile high-definition link (MHL), the Audio Engineering Society/European Broadcasting Union (AES/EBU), Optical, Coaxial, etc.

In particular, the display apparatus 100 according to one or more embodiments of the disclosure may communicate with the source apparatus 10, and transmit the first apparatus information corresponding to the display apparatus 100, the second apparatus information corresponding to the external display apparatus 200 connected to the display apparatus 100, etc.

The at least one processor 150 according to one or more embodiments controls the overall operations of the display apparatus 100.

According to one or more embodiments of the disclosure, the processor 150 may be implemented as a digital signal processor (DSP) processing digital signals, a microprocessor, and a timing controller (TCON). However, the disclosure is not limited thereto, and the processor 150 may include one or more of a central processing unit (CPU), a micro controller unit (MCU), a micro processing unit (MPU), a controller, an application processor (AP) or a communication processor (CP), an ARM processor, and an artificial intelligence (AI) processor, or may be defined by the terms. Also, the processor 150 may be implemented as a system on chip (SoC) having a processing algorithm stored therein or large scale integration (LSI), or implemented in the form of a field programmable gate array (FPGA). The processor 150 may perform various functions by executing computer executable instructions stored in the memory.

The at least one processor 150 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 150 may control one or a random combination of the other components of the electronic apparatus, and perform an operation related to communication or data processing. Also, the at least one processor 150 may execute one or more programs or instructions stored in the memory. For example, the at least one processor 150 may perform the method according to one or more embodiments of the disclosure by executing the one or more instructions stored in the memory.

In case the method according to one or more embodiments of the disclosure includes a plurality of operations, the plurality of operations may be performed by one processor, or performed by a plurality of processors. For example, when a first operation, a second operation, and a third operation are performed by the method according to one or more embodiments, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 150 may be implemented as a single core processor including one core, or may be implemented as one or more multicore processors including a plurality of cores (e.g., multicores of the same kind or multicores of different kinds). In case the at least one processor 150 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according one or more embodiments of the disclosure and perform the instruction, or the plurality of entire cores (or some of the cores) may be linked with one another, and read a program instruction for implementing the method according to one or more embodiments of the disclosure and perform the instruction.

In case the method according to one or more embodiments of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to one or more embodiments, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the processor may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, a DSP, an NPU, a hardware accelerator, or a machine learning accelerator, etc., but the embodiments of the disclosure are not limited thereto.

As illustrated in FIG. 1, if connection with the external display apparatus 200 is detected through the sensor 120, the at least one processor 150 according to one or more embodiments may receive the second apparatus information corresponding to the external display apparatus 200.

As one or more examples, the second apparatus information corresponding to the external display apparatus 200 may mean EDID information including information on the manufacturer ID, the apparatus ID, the EDID version, the types of the phosphor or the filter, the timing, the screen size (the horizontal size and the vertical size), the resolution, the supported function, the color characteristic (the color space), the luminance, etc. of the external display apparatus 200.

When the second apparatus information corresponding to the external display apparatus 200 is received, the at least one processor 150 according to one or more embodiments of the disclosure may generate integrated apparatus information based on the first apparatus information corresponding to the display apparatus 100 and the second apparatus information corresponding to the external display apparatus 200.

As one or more examples, the at least one processor 150 may generate integrated apparatus information including information on resolutions that can be provided through the display apparatus 100 and the external display apparatus 200 by merging (or, adding) the resolution information of the external display apparatus 200 included in the second apparatus information to the resolution information of the display apparatus 100 included in the first apparatus information.

If the external display apparatus 200 connected to the left side (or, the right side) based on the display apparatus 100 is detected through the sensor 120, the at least one processor 150 according to one or more embodiments may identify an arrangement form of the display apparatus 100 and the external display apparatus 200 (e.g., a horizontal form) based on information on the connection location of the external display apparatus 200.

As another example, if the external display apparatus 200 connected to the upper side (or, the lower side) based on the display apparatus 100 is detected through the sensor 120, the at least one processor 150 may identify an arrangement form of the display apparatus 100 and the external display apparatus 200 (e.g., a vertical form) based on information on the connection location of the external display apparatus 200.

The at least one processor 150 according to one or more embodiments may identify the maximum resolution according to an arrangement form based on the resolution of the display apparatus 100 and the resolution of the external display apparatus 200.

Detailed explanation in this regard will be described with reference to FIG. 3.

Figure 3:
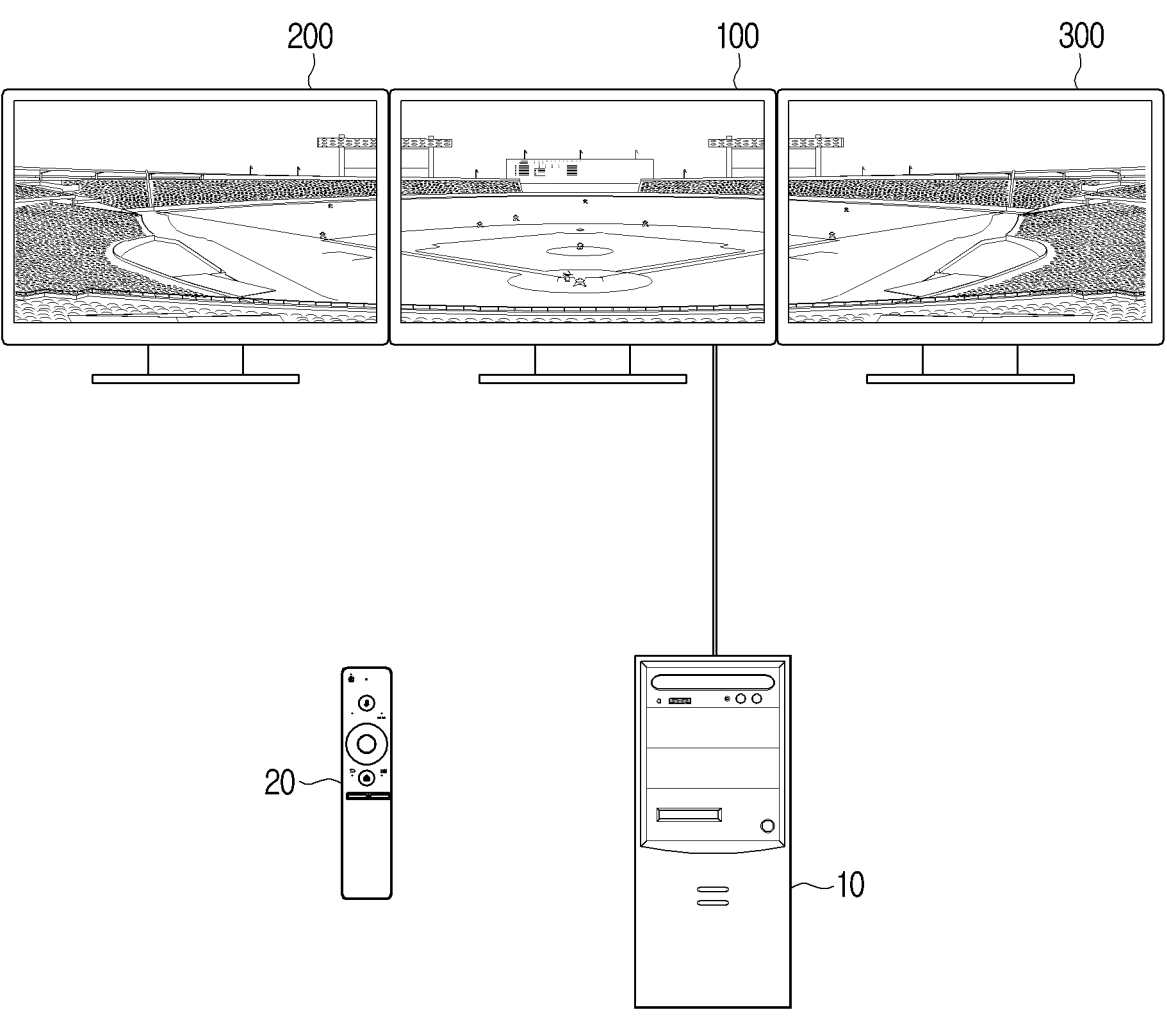
FIG. 3 is a diagram for illustrating a display apparatus detecting connection of a plurality of external display apparatuses according to one or more embodiments of the disclosure.

FIG. 3 is a diagram for illustrating a display apparatus detecting connection of a plurality of external display apparatuses according to one or more embodiments of the disclosure.

Referring to FIG. 3, a first external display apparatus 200 may be connected to the left side, and a second external display apparatus 300 may be connected to the right side based on the front surface of the display apparatus 100.

<Detecting Connection>

Referring to FIG. 1, if the first external display apparatus 200 is connected to the left side of the display apparatus 100, the display apparatus 100 may receive the second apparatus information from the first external display apparatus 200.

As illustrated in FIG. 1, if connection of the first external display apparatus 200 is connected on the left side of the display apparatus 100 through the sensor 120, the at least one processor 150 may identify the arrangement form of the display apparatus 100 and the first external display apparatus 200.

For example, the sensor 120 may include a plurality of sensors, and if connection of the first external display apparatus 200 is detected through a first sensor among the plurality of sensors, the at least one processor 150 may identify the arrangement form wherein the first external display apparatus 200 is connected to the left side of the display apparatus 100.

Then, the at least one processor 150 may generate integrated apparatus information including information on the maximum resolution (e.g., a 5120×1440 resolution) that can be provided according to the arrangement form based on the first apparatus information and the second apparatus information.

Then, the at least one processor 150 may transmit the integrated apparatus information to the source apparatus 10, and receive an image signal from the source apparatus 10.

The at least one processor 150 according to one or more embodiments may distribute the received image signal to the first external display apparatus 200, and the display apparatus 100 and the first external display apparatus 200 may display a screen corresponding to the image signal. For example, when an image signal is received, the at least one processor 150 may transmit a signal controlling the first external display apparatus 200 to display a part of a screen corresponding to the image signal based on the arrangement form to the first external display apparatus 200.

<Detecting Additional Connection>

As one or more examples, the second external display apparatus 300 may be additionally connected to the right side based on the front surface of the display apparatus 100. The at least one processor 150 may receive third apparatus information from the second external display apparatus 300.

As illustrated in FIG. 3, if connection of the second external display apparatus 300 is detected on the right side of the display apparatus 100 through the sensor 120, the at least one processor 150 may identify the arrangement form of the display apparatus 100, the first external display apparatus 200, and the second external display apparatus 300.

For example, the sensor 120 may include a plurality of sensors, and if connection of the second external display apparatus 300 is additionally detected through a second sensor among the plurality of sensors, the at least one processor 150 may identify the arrangement form wherein the first external display apparatus 200 is connected to the left side, and the second external display apparatus 300 is connected to the right side of the display apparatus 100.

Then, the at least one processor 150 may update the integrated apparatus information including information on the maximum resolution (e.g., a 7680×1440 resolution) that can be provided according to the arrangement form based on the first apparatus information, the second apparatus information, and the third apparatus information.

Then, the at least one processor 150 may transmit the updated integrated apparatus information to the source apparatus 10, and receive an image signal from the source apparatus 10.

The at least one processor 150 according to one or more embodiments may distribute the received image signal to the first external display apparatus 200 and the second external display apparatus 300, and the display apparatus 100, the first external display apparatus 200, and the second external display apparatus 300 may display a screen corresponding to the image signal.

For example, when an image signal is received, the at least one processor 150 may transmit a signal controlling the first external display apparatus 200 to display a part of the left side of a screen corresponding to the image signal based on the arrangement form to the first external display apparatus 200, and transmit a signal controlling the second external display apparatus 300 to display a part of the right side of the screen corresponding to the image signal to the second external display apparatus 300.

In FIG. 1 and FIG. 3, explanation was described by assuming a case wherein the first external display apparatus 200 is connected to the left side, and the second external display apparatus 300 is connected to the right side based on the display apparatus 100 for the convenience of explanation, but this is merely one or more examples, and the disclosure is not limited thereto.

For example, the first external display apparatus 200 can be connected to the left side based on the display apparatus 100, and the second external display apparatus 300 can be connected to the left side based on the first external display apparatus 200. In this case, the first external display apparatus 200 may receive the third apparatus information from the second external display apparatus 300, and the display apparatus 100 may receive the second apparatus information and the third apparatus information from the first external display apparatus 200.

The at least one processor 150 according to one or more embodiments may generate integrated apparatus information according to an arrangement form based on the first to third apparatus information. Then, the at least one processor 150 may transmit the integrated apparatus information to the source apparatus 10, and receive an image signal corresponding to information on the maximum resolution that can be provided through the display apparatus 100, the first external display apparatus 200, and the second external display apparatus 300 from the source apparatus 10.

Hereinafter, a structure for connecting or disconnecting the external display apparatuses (e.g., the first external display apparatus 200 and the second external display apparatus 300) to or from the display apparatus 100 according to one or more embodiments of the disclosure will be explained.

Figure 4:
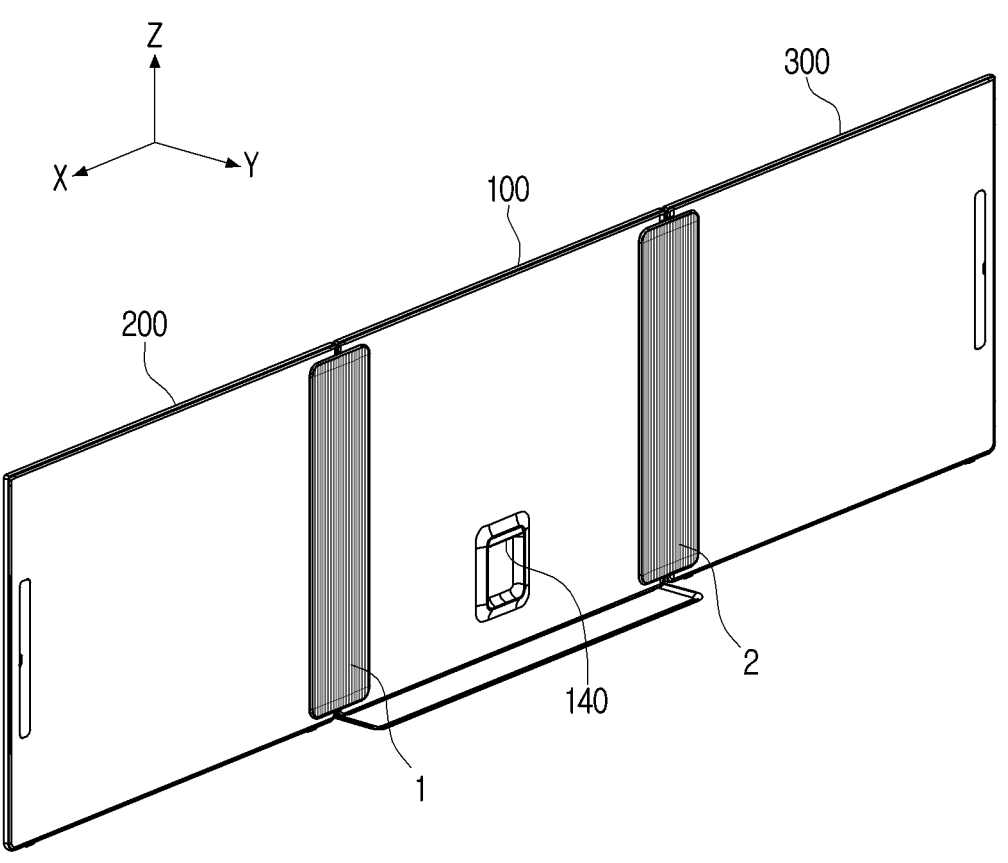
FIG. 4 is a diagram illustrating one or more embodiments wherein a plurality of display apparatuses are electrically and physically connected by a bridge apparatus according to one or more embodiments of the disclosure.
Figure 5:
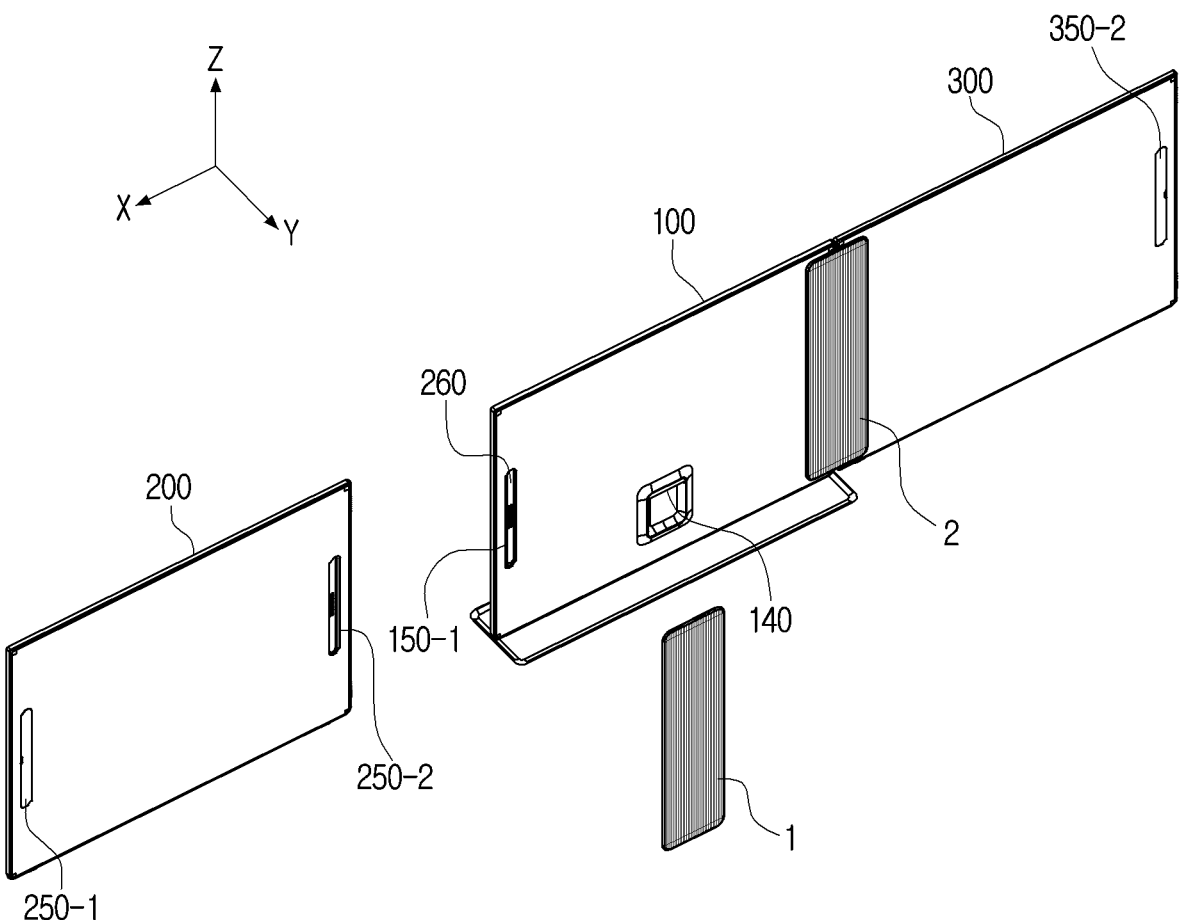
FIG. 5 is a diagram illustrating a state before a plurality of display apparatuses are connected by a bridge apparatus according to one or more embodiments of the disclosure.

FIG. 4 is a diagram illustrating one or more embodiments wherein a plurality of display apparatuses are electrically and physically connected by a bridge apparatus according to one or more embodiments of the disclosure. FIG. 5 is a diagram illustrating a state before a plurality of display apparatuses are connected by a bridge apparatus according to one or more embodiments of the disclosure.

In several embodiments of the disclosure, a bridge apparatus means an apparatus for connecting a plurality of apparatuses with one another. The bridge apparatus may alternatively be referred to as various terms such as a connection apparatus, a link apparatus, a combination apparatus, an assembly apparatus, etc.

The bridge apparatus according to one or more embodiments may electrically and physically connect two display apparatuses. In the disclosure, one or more examples wherein three display apparatuses are connected by using two bridge apparatuses will be explained. Like this, if n bridge apparatuses according to one or more embodiments are used, n+1 display apparatuses may be electrically and physically connected.

Referring to FIG. 4, the bridge apparatus according to one or more embodiments may include a first bridge apparatus 1 that can electrically and physically connect the display apparatus 100 and the first external display apparatus 200, and a second bridge apparatus 2 that can electrically and physically connect the display apparatus 100 and the second external display apparatus 300.

The first bridge apparatus 1 may be arranged on one side of the rear surface of the display apparatus 100 and the other side of the rear surface of the first external display apparatus 200. The second bridge apparatus 2 may be arranged on the other side of the rear surface of the display apparatus 100 and one side of the rear surface of the second external display apparatus 300. Accordingly, the first bridge apparatus 1 and the second bridge apparatus 2 may not be seen from the front surfaces of the display apparatus 100, the first external display apparatus 200, and the second external display apparatus 300.

In FIG. 4, the first external display apparatus 200 may be arranged on the left side of the display apparatus 100, and the second external display apparatus 300 may be arranged on the right side of the display apparatus 100, but this is just one or more examples for the convenience of explanation, and a contrary case is possible. As a stand is connected to the lower end of the display apparatus 100, the display apparatus 100, the first external display apparatus 200, and the second external display apparatus 300 may be arranged approximately vertically to a table or the bottom.

Each of the display apparatus 100, the first external display apparatus 200, and the second external display apparatus 300 may be a monitor or a television (TV). On the rear surface of the display apparatus 100, a communication interface 140 implemented as a port may be provided. The display apparatus 100 may receive external power through the port, and transmit and receive signals. To the port of the display apparatus 100, a separate apparatus (e.g., a personal computer (PC), a video game console, a digital set-top box, etc.) (referred to as the source apparatus 10 hereinafter) may be connected.

According to one or more embodiments, the display apparatus 100 may be a monitor or a TV, but is not limited thereto, and it may be an all in one PC wherein a display panel and a control apparatus are integrated.

Each of the first external display apparatus 200 and the second external display apparatus 300 may receive power and a signal from the display apparatus 100 through the first bridge apparatus 1 and the second bridge apparatus 2. Accordingly, the first external display apparatus 200 and the second external display apparatus 300 may not include a port for connecting a cable for reception of power and a signal, etc.

The first external display apparatus 200 may receive power from the display apparatus 100 through the first bridge apparatus 1. The first external display apparatus 200 may transmit and receive signals with the display apparatus 100 or a separate control apparatus (e.g., the source apparatus 10) connected with the display apparatus 100 through the first bridge apparatus 1. The second external display apparatus 300 may receive power from the display apparatus 100 through the second bridge apparatus 2. The second external display apparatus 300 may transmit and receive signals with the display apparatus 100 or a separate control apparatus (e.g., the source apparatus 10) connected with the display apparatus 100 through the second bridge apparatus 2.

Referring to FIG. 5, a docking hole may be provided on both sides of the rear surface of each of the display apparatus 100, the first external display apparatus 200, and the second external display apparatus 300. In this case, a first coupling member of the first bridge apparatus 1 is connected to a first docking hole 150-1 provided on one side of the display apparatus 100, and a second coupling member of the first bridge apparatus 1 is connected to a second docking hole 250-2 provided on the other side of the first external display apparatus 200, and thus the display apparatus 100 and the first external display apparatus 200 may be electrically and physically connected.

For example, if a connection signal is detected from the first external display apparatus 200 through the docking hole provided on one side of the display apparatus 100, the sensor 120 may detect connection of the first external display apparatus 200.

For example, if a connection signal is not detected from the first external display apparatus 200 during a predetermined time through the docking hole provided on one side of the display apparatus 100, the sensor 120 may detect disconnection of the first external display apparatus 200.

Here, a connection signal may be transmitted to the docking hole provided on one side of the display apparatus 100 from the first external display apparatus 200 through the first bridge apparatus 1.

For example, the docking hole may include a plurality of terminals, and a first terminal among the plurality of terminals is a terminal for supplying power to the first external display apparatus 200 through the first bridge apparatus 1, and a second terminal is a terminal for transmitting and receiving control signals, image signals, etc. with the first external display apparatus 200, and a third terminal may be a terminal for detecting connection of the first external display apparatus 200.

However, this is just one or more examples for the convenience of explanation, and the number of the terminals included in the docking holes, the functions of each of the plurality of terminals (e.g., supply of power, the types of signals that they transmit and receive (e.g., a control signal, a connection signal, etc.) can be changed variously. For example, if a control signal, an image signal, etc. are received from the first external display apparatus 200 through the second terminal, the display apparatus 100 may detect connection of the first external display apparatus 200, and if a control signal, an image signal, etc. are not received from the first external display apparatus 200 through the second terminal, the display apparatus 100 may detect disconnection of the first external display apparatus 200.

Figure 6:
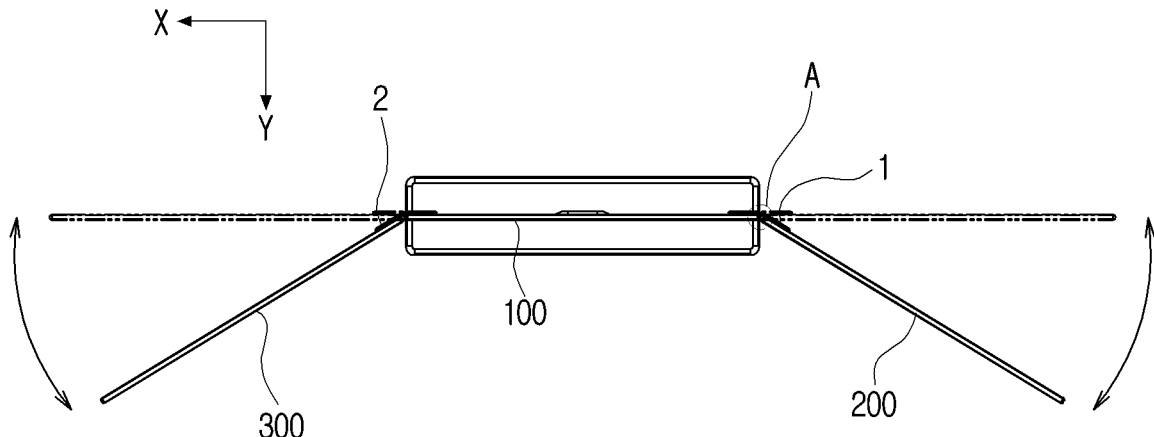
FIG. 6 is a diagram illustrating a folding operation of a plurality of display apparatuses connected by a bridge apparatus according to one or more embodiments of the disclosure.
Figure 7:
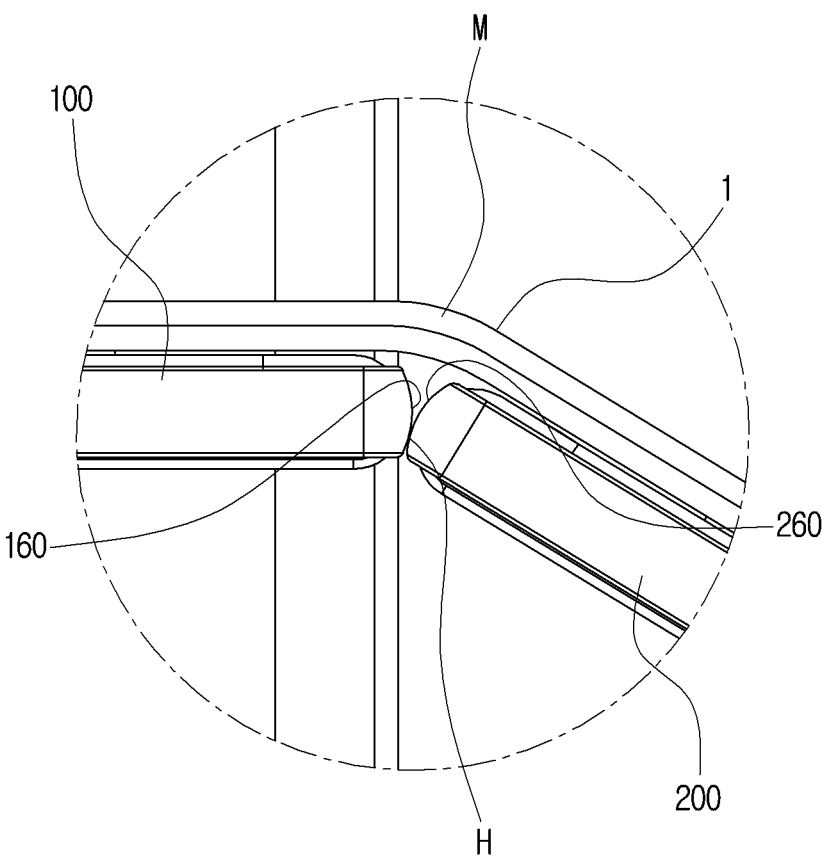
FIG. 7 is an enlarged view illustrating the A part displayed in FIG. 4.

FIG. 6 is a diagram illustrating a folding operation of a plurality of display apparatuses connected by a bridge apparatus according to one or more embodiments of the disclosure. FIG. 7 is an enlarged view illustrating the A part displayed in FIG. 4.

Referring to FIG. 6, each of the first external display apparatus 200 and the second external display apparatus 300 may be folded by a specific angle with respect to the display apparatus 100 by the first bridge apparatus 1 and the second bridge apparatus 2. The first bridge apparatus 1 and the second bridge apparatus 2 may consist of a structure and a material that are bendable.

Referring to FIG. 7, when the first external display apparatus 200 is folded by a specific angle with respect to the display apparatus 100, the side surface 160 of the display apparatus 100 and the side surface 260 of the first external display apparatus 200 contact each other. In this case, the side surface 160 of the display apparatus 100 and the side surface 260 of the first external display apparatus 200 may have specific curved surfaces such that they protrude in a direction of facing each other. The curvature of the side surface 160 of the display apparatus 100 and the curvature of the side surface 260 of the first external display apparatus 200 may be substantially identical.

The side surface 160 of the display apparatus 100 and the side surface 260 of the first external display apparatus 200 may linearly contact along the vertical direction of the display apparatus 100 and the first external display apparatus 200. In this case, the tangent line that is formed as the side surface 160 of the display apparatus 100 and the side surface 260 of the first external display apparatus 200 contact each other may function as a hinge axis H which is the rotation center of the display apparatus 100 and the first external display apparatus 200.

For example, in a state wherein the display apparatus 100 and the first external display apparatus 200 are arranged in parallel, in case the first external display apparatus 200 is folded toward the front side of the first external display apparatus 200, the first external display apparatus 200 may rotate based on the hinge axis H. The hinge axis H may not be fixed on one point, but may move from the rear side to the front side of the first external display apparatus 200.

The center portion M of the first bridge apparatus 1 is bended so as not to interfere with an operation of the first external display apparatus 200 of rotating around the hinge axis H. Accordingly, the first external display apparatus 200 may be folded by a specific angle smoothly with respect to the display apparatus 100.

The first bridge apparatus 1 and the second bridge apparatus 2 may be constituted to be substantially identical.

Figure 8:
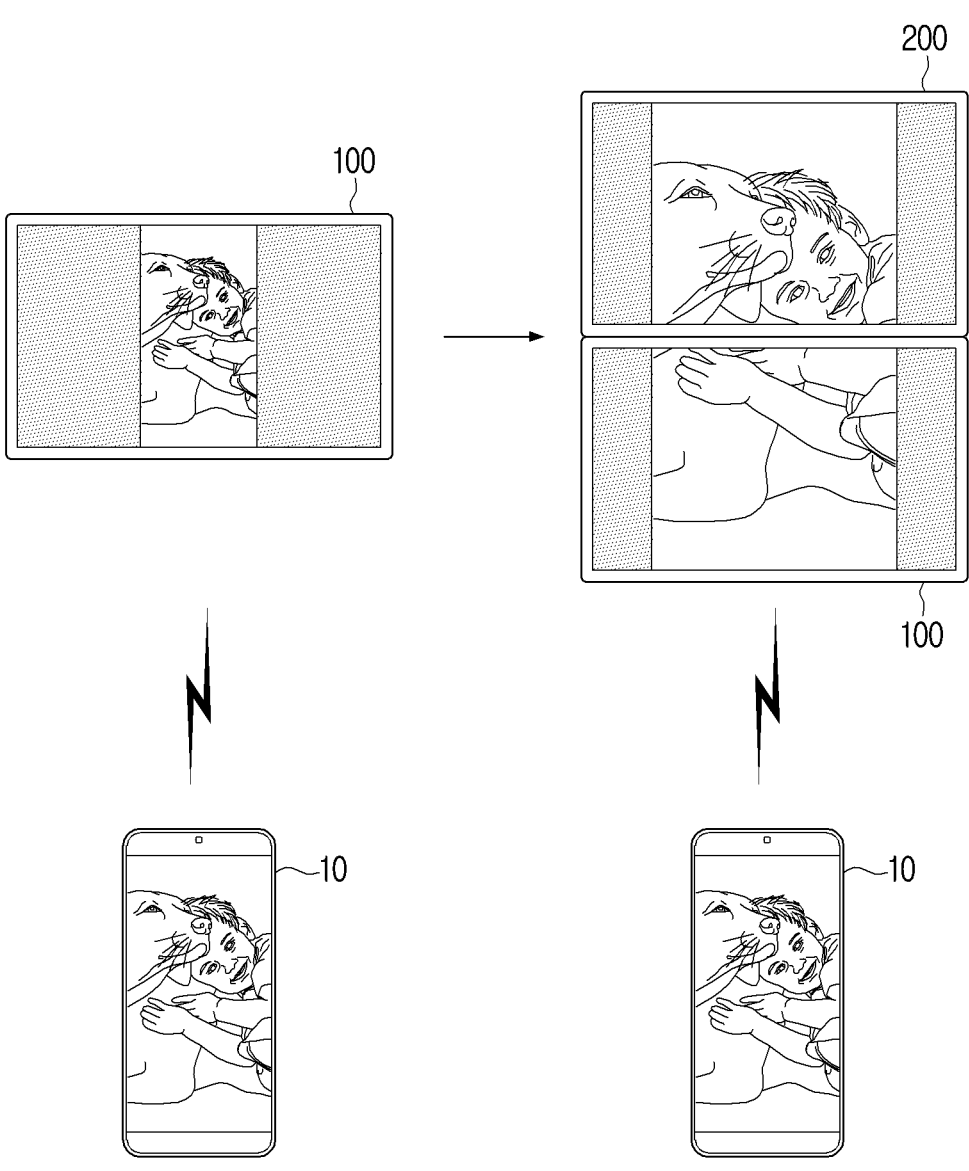
FIG. 8 is a diagram for illustrating a display apparatus detecting connection of an external display apparatus according to one or more embodiments of the disclosure.

FIG. 8 is a diagram for illustrating a display apparatus detecting connection of an external display apparatus according to one or more embodiments of the disclosure.

As illustrated in FIG. 8, if connection of the first external display apparatus 200 is detected on the upper side of the display apparatus 100 through the sensor 120, the at least one processor 150 may identify the arrangement form of the display apparatus 100 and the first external display apparatus 200.

Then, the at least one processor 150 may generate integrated apparatus information including information on the maximum resolution (e.g., a 2560×2880 resolution) that can be provided according to the arrangement form based on the first apparatus information and the second apparatus information.

Then, the at least one processor 150 may transmit the integrated apparatus information to the source apparatus 10, and receive an image signal from the source apparatus 10. The display apparatus 100 can receive an image signal from the source apparatus 10, or the display apparatus 100 can obtain an image signal by itself. For example, the display apparatus 100 may obtain an image signal through a tuner, or obtain an image signal based on image data stored in the display apparatus 100.

The at least one processor 150 according to one or more embodiments may change the resolution of a screen corresponding to the image signal based on the resolution information included in the integrated apparatus information. For example, the at least one processor 150 may upscale (or, downscale) the resolution of the screen to correspond to the resolution information included in the integrated apparatus information.

Also, the at least one processor 150 can change the size of the screen corresponding to the image signal based on the size information included in the integrated apparatus information. As one or more examples, the at least one processor 150 may generate size information by adding the screen size of the display apparatus 100 and the screen size of the first external display apparatus 200 according to the arrangement form.

The at least one processor 150 according to one or more embodiments may distribute the image signal to the first external display apparatus 200, and the display apparatus 100 and the first external display apparatus 200 may display a screen corresponding to the image signal.

Figure 9:
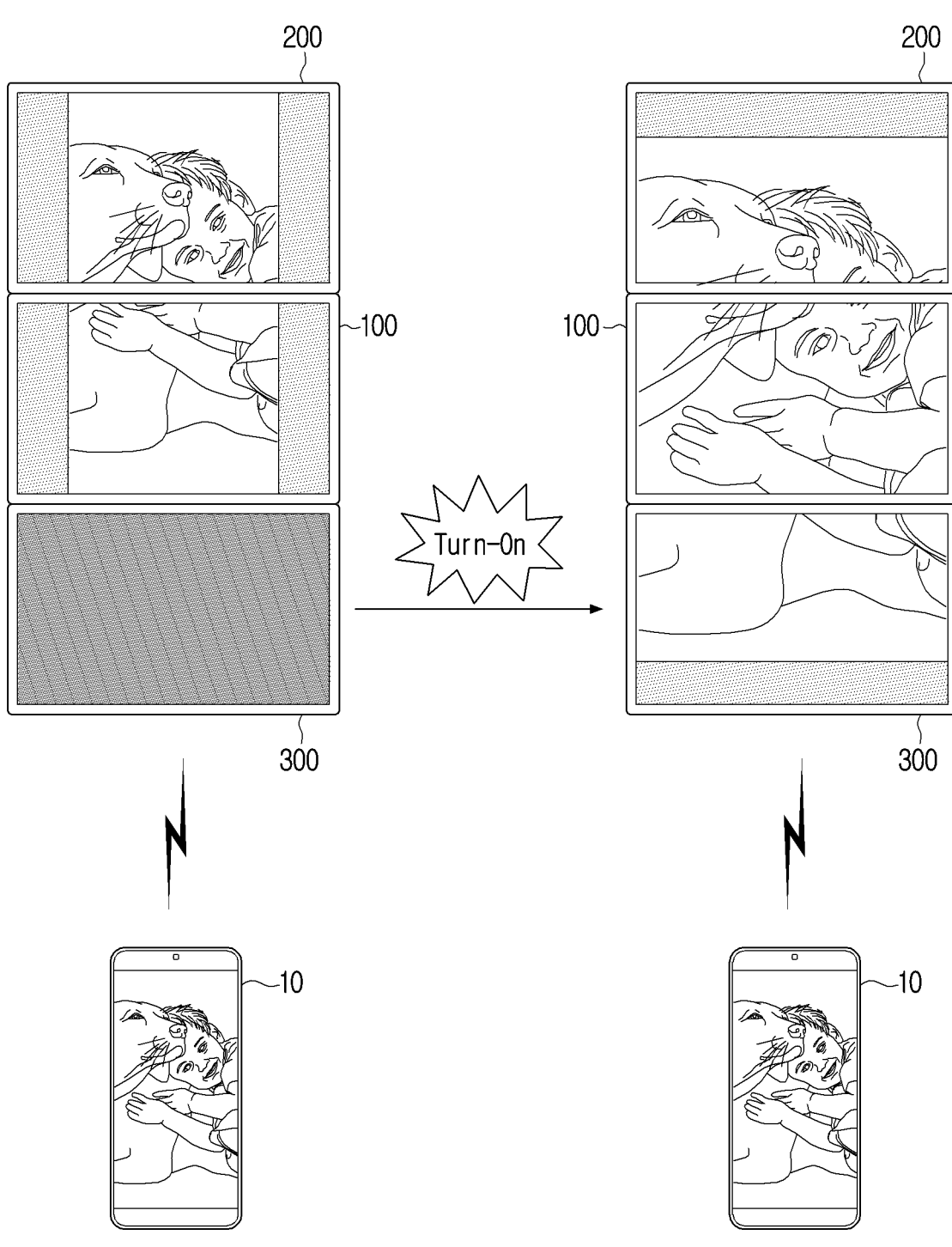
FIG. 9 is a diagram for illustrating a plurality of external display apparatuses displaying screens corresponding to an image signal according to one or more embodiments of the disclosure.

FIG. 9 is a diagram for illustrating a plurality of external display apparatuses displaying screens corresponding to an image signal according to one or more embodiments of the disclosure.

As illustrated in FIG. 9, the first external display apparatus 200 may be connected to the upper side based on the display apparatus 100, and the second external display apparatus 300 may be connected to the lower side based on the display apparatus 100.

The at least one processor 150 according to one or more embodiments may identify the driving states (or, the modes) of each of the first external display apparatus 200 and the second external display apparatus 300.

For example, if the first external display apparatus 200 is in a turned-on state, and the second external display apparatus 300 is in a turned-off state, the at least one processor 150 may identify the arrangement form of the display apparatus 100 and the first external display apparatus 200.

The at least one processor 150 according to one or more embodiments may receive the second apparatus information from the first external display apparatus 200 which is in a turned-on state.

The at least one processor 150 according to one or more embodiments may generate integrated apparatus information including information on the maximum resolution that can be provided according to the arrangement form based on the first apparatus information and the second apparatus information.

Then, the at least one processor 150 may transmit the integrated apparatus information to the source apparatus 10, and receive an image signal from the source apparatus 10. The at least one processor 150 may distribute the image signal received from the source apparatus 10 to the first external display apparatus 200, and the display apparatus 100 and the first external display apparatus 200 may display a screen corresponding to the image signal.

<Changing to a Turn-on State>

According to one or more embodiments, if the second display apparatus 300 connected to the lower side of the display apparatus 100 is changed from a turned-off state to a turned-on state, the at least one processor 150 may identify the arrangement form of the display apparatus 100, the first external display apparatus 200, and the second external display apparatus 300.

The at least one processor 150 according to one or more embodiments may receive the third apparatus information from the second external display apparatus 300 which is in a turned-on state.

The at least one processor 150 according to one or more embodiments may update (or, reobtain) the integrated apparatus information including information on the maximum resolution (e.g., a 2560×4320 resolution) that can be provided according to the arrangement form based on the first apparatus information, the second apparatus information, and the third apparatus information. Then, the at least one processor 150 may transmit the updated integrated apparatus information to the source apparatus 10, and receive an image signal from the source apparatus 10.

According to one or more embodiments, if the external display apparatus 200 changed to a turned-on state is detected, the display apparatus 100 may operate identically to when the external display apparatus 200 is connected.

<Changing to a Turned-Off State>

According to one or more embodiments, if the second external display apparatus 300 connected to the lower side of the display apparatus 100 is changed from a turned-on state to a turned-off state, the at least one processor 150 may identify the arrangement form of the display apparatus 100 and the first external display apparatus 200. As one or more examples, the at least one processor 150 may exclude the second external display apparatus 300 from the arrangement form.

The at least one processor 150 according to one or more embodiments may update (or, reobtain) the integrated apparatus information including information on the maximum resolution (e.g., a 2560×2880 resolution) that can be provided according to the arrangement form based on the first apparatus information and the second apparatus information. As one or more examples, the at least one processor 150 may update the integrated apparatus information by excluding the third apparatus information corresponding to the second external display apparatus 300 which is in a turned-off state from the integrated apparatus information.

Then, the at least one processor 150 may transmit the updated integrated apparatus information (i.e., the integrated apparatus information from which the third apparatus information was excluded) to the source apparatus 10, and receive an image signal from the source apparatus 10.

According to one or more embodiments, if the external display apparatus 200 changed to a turned-off state is detected, the display apparatus 100 may operate identically to when the external display apparatus 200 was disconnected.

Figure 10:
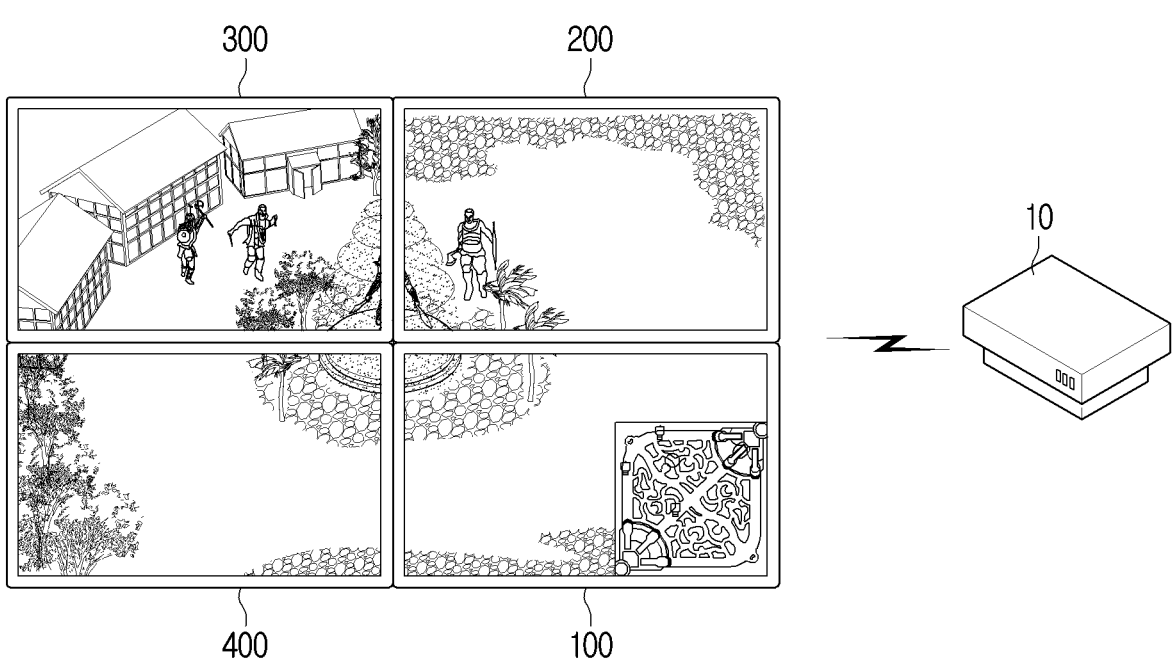
FIG. 10 is a diagram for illustrating a plurality of external display apparatuses according to one or more embodiments of the disclosure.

FIG. 10 is a diagram for illustrating a plurality of external display apparatuses according to one or more embodiments of the disclosure.

According to one or more embodiments, the external display apparatus 200 may be connected to the left side or the right side based on the display apparatus 100, or the external display apparatus 200 may be connected to the upper side or the lower side based on the display apparatus 100, but this is just one or more examples for the convenience of explanation, and the disclosure is not limited thereto. For example, the plurality of display apparatuses 100, 200, 300, . . . may also be arranged in a matrix form.

As illustrated in FIG. 10, as one or more examples, the first external display apparatus 200 may be connected to the upper side of the display apparatus 100, and the second external display apparatus 300 may be connected to the upper left side, and the third external display apparatus 400 may be connected to the left side.

The display apparatus 100 according to one or more embodiments may receive the second apparatus information from the first external display apparatus 200, receive the third apparatus information from the second external display apparatus 300, and receive the fourth apparatus information from the third external display apparatus 400.

The at least one processor 150 according to one or more embodiments may generate integrated apparatus information including information on the maximum resolution that can be provided according to the arrangement form based on the first apparatus information to the fourth apparatus information.

Then, the at least one processor 150 may transmit the integrated apparatus information to the source apparatus 10, and receive an image signal from the source apparatus 10.

According to one or more embodiments, the resolution of a screen corresponding to the image signal received from the source apparatus 10 may be identical to the resolution corresponding to the maximum resolution information.

Figure 11:
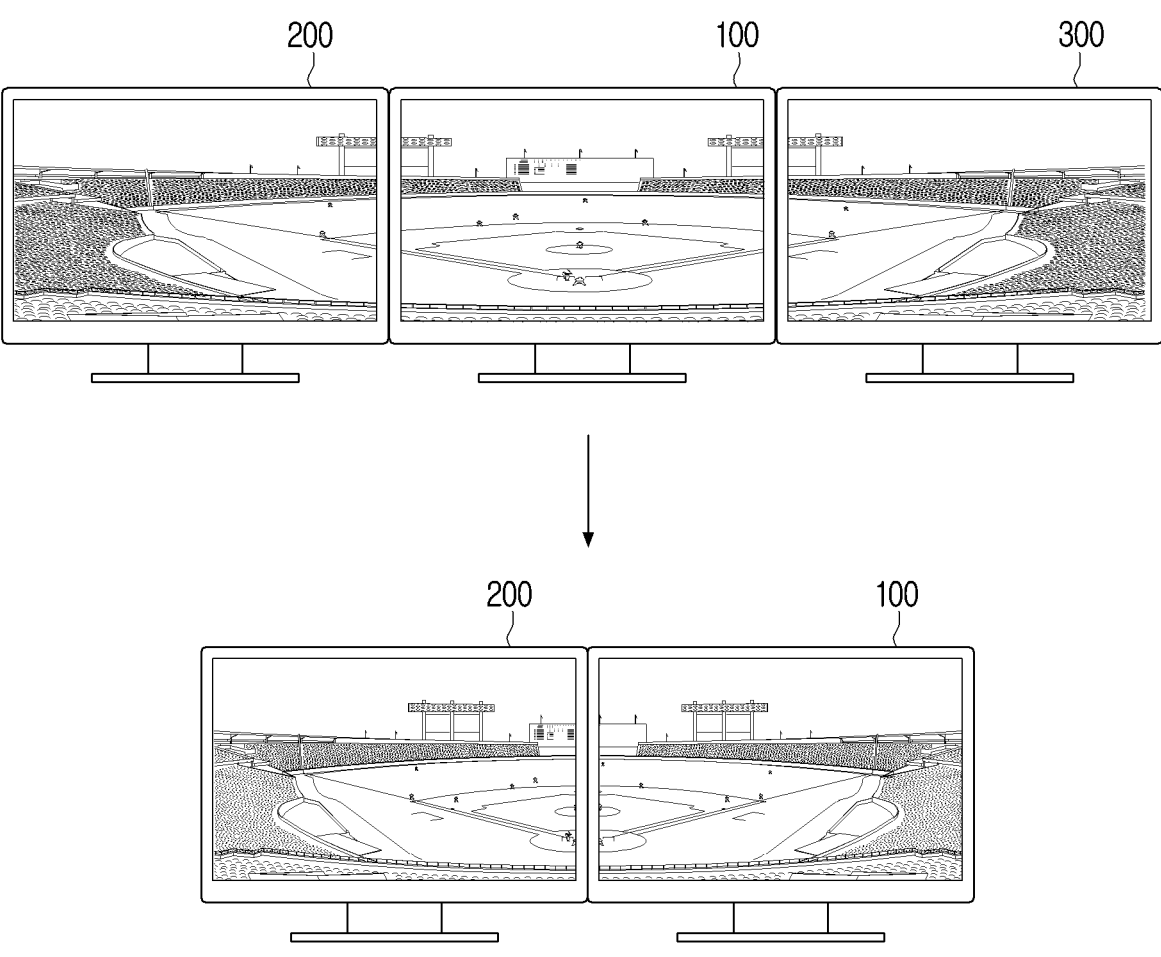
FIG. 11 is a diagram for illustrating a display apparatus detecting disconnection of an external display apparatus according to one or more embodiments of the disclosure.

FIG. 11 is a diagram for illustrating a display apparatus detecting disconnection of an external display apparatus according to one or more embodiments of the disclosure.

Referring to FIG. 11, the first external display apparatus 200 may be connected to the left side, and the second external display apparatus 300 may be connected to the right side based on the front surface of the display apparatus 100.

<Detecting Disconnection>

As illustrated in FIG. 11, if disconnection of the second external display apparatus 300 is detected on the right side of the display apparatus 100 through the sensor 120, the at least one processor 150 may identify the arrangement form of the display apparatus 100, the first external display apparatus 200, and the second external display apparatus 300. As one or more examples, the at least one processor 150 may exclude the second external display apparatus 300 from the arrangement form.

The at least one processor 150 according to one or more embodiments may update (or, reobtain) the integrated apparatus information including information on the maximum resolution (e.g., a 5120×1440 resolution) that can be provided according to the arrangement form based on the first apparatus information and the second apparatus information. As one or more examples, the at least one processor 150 may update the integrated apparatus information by excluding the third apparatus information corresponding to the second external display apparatus 300 that was disconnected from the integrated apparatus information.

Then, the at least one processor 150 may transmit the updated integrated apparatus information (i.e., the integrated apparatus information from which the third apparatus information was excluded) to the source apparatus 10, and receive an image signal from the source apparatus 10.

The at least one processor 150 according to one or more embodiments may distribute the received image signal to the first external display apparatus 200, and the display apparatus 100 and the first external display apparatus 200 may display a screen corresponding to the image signal.

In the aforementioned embodiment, one or more embodiments wherein the integrated apparatus information is updated by adding or excluding resolution information among various kinds of information included in the apparatus information (EDID) was explained, for the convenience of explanation, but this is merely one or more examples, and the disclosure is not limited thereto.

For example, if the external display apparatus 200 is connected, the at least one processor 150 may generate integrated apparatus information wherein the apparatus information of the connected external display apparatus 200 was added. Here, the integrated apparatus information may include information on functions that can be performed at the external display apparatus 200. For example, the function information may include various operations related to the screen display such as a high dynamic range (HDR), a frame rate, a game mode, etc.

Also, if a control signal is received from the source apparatus 10 or a remote control apparatus 20 (see FIG. 3), the at least one processor 150 may transmit the control signal to the external display apparatus 200 such that the display apparatus 100 and the external display apparatus 200 are integrally controlled.

In addition, if the external display apparatus 200 is disconnected, the at least one processor 150 may generate integrated apparatus information excluding the apparatus information of the disconnected external display apparatus 200.

Figure 12:
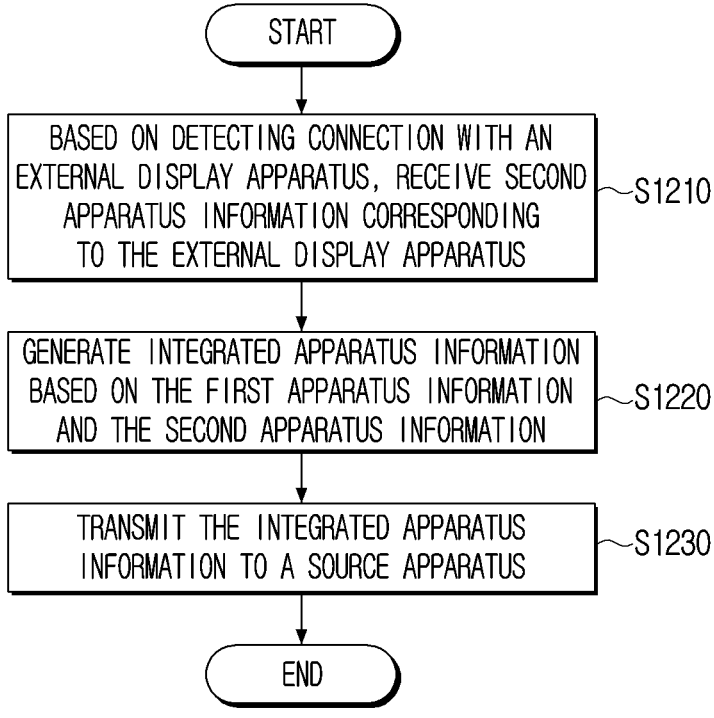
FIG. 12 is a flow chart for illustrating a control method of a display apparatus according to one or more embodiments of the disclosure.

FIG. 12 is a flow chart for illustrating a control method of a display apparatus according to one or more embodiments of the disclosure.

In a control method of a display apparatus including first apparatus information corresponding to the display apparatus according to one or more embodiments of the disclosure, if connection of an external display apparatus is detected, second apparatus information corresponding to the external display apparatus is received in operation S1210.

Then, integrated apparatus information is generated based on the first apparatus information and the second apparatus information in operation S1220.

Then, the integrated apparatus information is transmitted to a source apparatus in operation S1230. The integrated apparatus information according to one or more embodiments includes information on resolutions that can be displayed through the display apparatus and the external display apparatus.

The control method according to one or more embodiments may further include, based on receiving an image signal from the source apparatus, transmitting the received image signal to the external display apparatus and displaying a screen corresponding to the image signal by using the display apparatus and the external display apparatus.

The control method according to one or more embodiments may further include, based on detecting disconnection of the external display apparatus, updating the integrated apparatus information based on the first apparatus information, and transmitting the updated integrated apparatus information to the source apparatus. The updated integrated apparatus information according to one or more embodiments may include information on resolutions that can be displayed through the display apparatus.

The operation S1220 of generating the integrated apparatus information according to one or more embodiments may include, based on detecting connection of the external display apparatus at a first sensor among a plurality of sensors included in the display apparatus, identifying an arrangement form based on the first sensor, and generating the integrated apparatus information according to the arrangement form based on resolution information of the external display apparatus included in the second apparatus information corresponding to the external display apparatus, and resolution information of the display apparatus included in the first apparatus information corresponding to the display apparatus.

The control method according to one or more embodiments may include, based on receiving an image signal from the source apparatus, transmitting a signal controlling the external display apparatus to display a part of a screen corresponding to the image signal based on the arrangement form to the external display apparatus.

The control method according to one or more embodiments may further include changing a resolution of a screen corresponding to an image signal based on the resolution information included in the integrated apparatus information, and transmitting a signal controlling the external display apparatus to display a part of the screen of which resolution was changed based on the arrangement form to the external display apparatus.

The image signal according to one or more embodiments may be a signal that was received from the source apparatus, or obtained by the display apparatus.

The operation S1210 of receiving the second apparatus information according to one or more embodiments may include, based on detecting connection of the display apparatus according to turn-on of the external display apparatus, receiving the second apparatus information from the external display apparatus.

The control method according to one or more embodiments may further include, based on detecting disconnection of the display apparatus according to turn-off of the external display apparatus, updating the integrated apparatus information based on the first apparatus information, and the updated integrated apparatus information may be information from which the resolution information of the external display apparatus included in the second apparatus information was excluded.

The control method according to one or more embodiments may further include, based on receiving a control signal from the source apparatus or the remote control apparatus, transmitting the control signal to the external display apparatus.

The various embodiments of the disclosure can be applied not only to a display apparatus, but also to all types of electronic apparatuses including a display function.

The various embodiments described above may be implemented in a recording medium that can be read by a computer or an apparatus similar to a computer, by using software, hardware, or a combination thereof. In some cases, the embodiments described in this specification may be implemented as the processor itself. According to implementation by software, the embodiments such as processes and functions described in this specification may be implemented as separate software modules. Each of the software modules can perform one or more functions and operations described in this specification.

Computer instructions for performing processing operations of the display apparatus 100 according to the aforementioned various embodiments of the disclosure may be stored in a non-transitory computer-readable medium. Computer instructions stored in such a non-transitory computer-readable medium make the processing operations at the display apparatus 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM, and the like.

Also, while example embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus comprising:

a memory storing first apparatus information corresponding to the display apparatus and instructions;

a sensor;

a display;

a communication interface; and at least one processor operatively connected to the memory, the sensor, the display, and the communication interface, the at least one processor being configured to execute the instructions to:

based on detecting connection with an external display apparatus through the sensor, receive second apparatus information corresponding to the external display apparatus from the external display apparatus, generate integrated apparatus information based on the first apparatus information and the second apparatus information, control the communication interface to transmit the integrated apparatus information to a source apparatus, based on detecting disconnection of the external display apparatus through the sensor, update the integrated apparatus information by excluding the second apparatus information, and control the communication interface to transmit the updated integrated apparatus information to the source apparatus, wherein the integrated apparatus information comprises resolution information on resolutions that can be displayed through the display apparatus and the external display apparatus, and wherein the updated integrated apparatus information comprises updated resolution information on resolutions that can be displayed through the display apparatus.

2. The display apparatus of claim 1, wherein the at least one processor is further configured to execute the instructions to:

based on receiving an image signal from the source apparatus, control the communication interface to transmit the image signal to the external display apparatus, and display a screen corresponding to the image signal by using the display apparatus and the external display apparatus.

3. The display apparatus of claim 1, wherein the sensor comprises a plurality of sensors, and wherein the at least one processor is further configured to execute the instructions to:

based on detecting connection of the external display apparatus at a first sensor among the plurality of sensors, identify an arrangement form based on the first sensor; and generate the integrated apparatus information according to the arrangement form based on second resolution information of the external display apparatus in the second apparatus information, and first resolution information of the display apparatus in the first apparatus information.

4. The display apparatus of claim 3, wherein the at least one processor is further configured to execute the instructions to:

based on receiving an image signal from the source apparatus, control the communication interface to transmit a signal controlling the external display apparatus to display a part of a screen corresponding to the image signal based on the arrangement form, to the external display apparatus.

5. The display apparatus of claim 3, wherein the at least one processor is further configured to execute the instructions to:

change a resolution of a screen corresponding to an image signal based on the resolution information in the integrated apparatus information; and control the communication interface to transmit a signal controlling the external display apparatus to display a part of the screen with changed resolution based on the arrangement form, to the external display apparatus.

6. The display apparatus of claim 5, wherein the image signal was received from the source apparatus, or obtained by the display apparatus.

7. The display apparatus of claim 1, wherein the at least one processor is further configured to execute the instructions to:

based on detecting connection of the display apparatus according to turn-on of the external display apparatus, receive the second apparatus information from the external display apparatus, and generate the integrated apparatus information based on the first apparatus information and the second apparatus information.

8. The display apparatus of claim 1, wherein the at least one processor is further configured to execute the instructions to:

based on detecting disconnection of the display apparatus according to turn-off of the external display apparatus, update the integrated apparatus information based on the first apparatus information, and wherein the updated integrated apparatus information excludes second resolution information of the external display apparatus in the second apparatus information.

9. The display apparatus of claim 1, wherein the at least one processor is further configured to execute the instructions to:

based on receiving a control signal from the source apparatus or a remote control apparatus, transmit the control signal to the external display apparatus.

10. A control method of a display apparatus, the control method comprising:

based on detecting connection with an external display apparatus, receiving second apparatus information corresponding to the external display apparatus from the external display apparatus;

generating integrated apparatus information based on the second apparatus information and first apparatus information corresponding to the display apparatus;

transmitting the integrated apparatus information to a source apparatus;

based on detecting disconnection of the external display apparatus through the sensor, updating the integrated apparatus information by excluding the second apparatus information; and transmitting the updated integrated apparatus information to the source apparatus, wherein the integrated apparatus information comprises:

resolution information on resolutions that can be displayed through the display apparatus and the external display apparatus, and wherein the updated integrated apparatus information comprises:

updated resolution information on resolutions that can be displayed through the display apparatus.

11. The control method of claim 10, further comprising:

based on receiving an image signal from the source apparatus, transmitting the image signal to the external display apparatus; and displaying a screen corresponding to the image signal by using the display apparatus and the external display apparatus.

12. The control method of claim 10, wherein the generating the integrated apparatus information comprises:

based on detecting connection of the external display apparatus at a first sensor among a plurality of sensors in the display apparatus, identifying an arrangement form based on the first sensor; and generating the integrated apparatus information according to the arrangement form based on second resolution information of the external display apparatus in the second apparatus information, and first resolution information of the display apparatus in the first apparatus information.

13. The control method of claim 12, wherein the control method comprises:

based on receiving an image signal from the source apparatus, transmitting a signal controlling the external display apparatus to display a part of a screen corresponding to the image signal based on the arrangement form to the external display apparatus.

14. The control method of claim 12, further comprising:

changing a resolution of a screen corresponding to an image signal based on the resolution information in the integrated apparatus information; and transmitting a signal controlling the external display apparatus to display a part of the screen with changed resolution based on the arrangement form, to the external display apparatus.

15. The control method of claim 14, wherein the image signal was received from the source apparatus, or obtained by the display apparatus.

16. The control method of claim 10, further comprising:

based on detecting connection of the display apparatus according to turn-on of the external display apparatus, receiving the second apparatus information from the external display apparatus, and generating the integrated apparatus information based on the first apparatus information and the second apparatus information.

17. The control method of claim 10, further comprising:

based on detecting disconnection of the display apparatus according to turn-off of the external display apparatus, updating the integrated apparatus information based on the first apparatus information, wherein the updated integrated apparatus information excludes second resolution information of the external display apparatus in the second apparatus information.

18. A non-transitory computer readable recording medium, which includes computer-readable code that when executed by a display apparatus causes the display apparatus to execute a control method, the control method comprising:

based on detecting connection with an external display apparatus, receiving second apparatus information corresponding to the external display apparatus from the external display apparatus;

generating integrated apparatus information based on the second apparatus information and first apparatus information corresponding to the display apparatus;

transmitting the integrated apparatus information to a source apparatus;

based on detecting disconnection of the external display apparatus through the sensor, updating the integrated apparatus information by excluding the second apparatus information; and transmitting the updated integrated apparatus information to the source apparatus, wherein the integrated apparatus information comprises:

resolution information on resolutions that can be dis-
played through the display apparatus and the external
display apparatus, and wherein the updated integrated apparatus information
comprises:

updated resolution information on resolutions that can
be displayed through the display apparatus.

\* \* \* \* \*